(12) United States Patent
Grebeck et al.

(10) Patent No.: US 11,715,133 B2
(45) Date of Patent: Aug. 1, 2023

(54) SYSTEMS AND METHODS FOR DETERMINING BIDS FOR PLACING ADVERTISEMENTS

(71) Applicant: Yahoo Ad Tech LLC, Dulles, VA (US)

(72) Inventors: Michael J. Grebeck, San Francisco, CA (US); Ali Nasiri Amini, Sunnyvale, CA (US); Aaron E. Flores, Mountain View, CA (US); Jose Carlos Garcia Franco, Mountain View, CA (US); Hans Marius Holtan, San Jose, CA (US); Robert Alden Luenberger, Los Altos, CA (US)

(73) Assignee: YAHOO AD TECH LLC, Dulles, VA (US)

( * ) Notice: Subject to any disclaimer, the term of this patent is extended or adjusted under 35 U.S.C. 154(b) by 0 days.

(21) Appl. No.: 14/059,194

(22) Filed: Oct. 21, 2013

(65) Prior Publication Data

US 2014/0046758 A1 Feb. 13, 2014

Related U.S. Application Data

(63) Continuation of application No. 13/465,568, filed on May 7, 2012, now Pat. No. 8,566,207, which is a
(Continued)

(51) Int. Cl.
*G06Q 30/0273* (2023.01)
*G06Q 40/04* (2012.01)
(Continued)

(52) U.S. Cl.
CPC ..... *G06Q 30/0275* (2013.01); *G06Q 30/0201* (2013.01); *G06Q 30/0247* (2013.01);
(Continued)

(58) Field of Classification Search
CPC .............. G06Q 30/00; G06Q 30/0275; G06Q 30/0201; G06Q 30/0247; G06Q 30/0273; G06Q 40/00
(Continued)

(56) References Cited

U.S. PATENT DOCUMENTS 7,308,428 B1  12/2007  Federspiel et al.
7,613,700 B1  11/2009  Lobo et al.
(Continued)

OTHER PUBLICATIONS

Haugh, Martin. "Term Structure Lattice Models," Term Structure Models, (Spring 2005). (Year: 2005).*
(Continued)

*Primary Examiner* — Elizabeth H Rosen
(74) *Attorney, Agent, or Firm* — Bookoff McAndrews, PLLC

(57) ABSTRACT

Systems, apparatuses, and methods are provided for determining a bid value for placing an advertisement onto advertising space available through an electronic marketplace. A method is used for calculating the option value of maintaining the advertisement in the advertising space during one or more periods of time. The option value may be based on expected profits and the estimated future value of maintaining the advertisement. The option value may then be used to calculate the bid price for placing the advertisement.

20 Claims, 7 Drawing Sheets

Related U.S. Application Data continuation of application No. 12/314,323, filed on Dec. 8, 2008, now Pat. No. 8,175,950.

(51) Int. Cl.
*G06Q 30/0201* (2023.01)
*G06Q 40/00* (2023.01)
*G06Q 40/06* (2012.01)
*G06Q 30/0241* (2023.01)

(52) U.S. Cl.
CPC ......... *G06Q 30/0273* (2013.01); *G06Q 40/00* (2013.01); *G06Q 40/04* (2013.01); *G06Q 40/06* (2013.01)

(58) Field of Classification Search
USPC .............................. 705/14.41, 36 R; 706/21
See application file for complete search history.

(56) References Cited

U.S. PATENT DOCUMENTS

| | | | |
|---|---|---|---|
| 7,698,165 | B1 | 4/2010 | Tawakol et al. |
| 7,792,698 | B1 | 9/2010 | Veach et al. |
| 7,805,331 | B2 | 9/2010 | Demir et al. |
| 7,822,636 | B1 | 10/2010 | Ferber et al. |
| 7,908,238 | B1 | 3/2011 | Nolet et al. |
| 8,301,649 | B1* | 10/2012 | Hansen ................ G06F 16/951 707/758 |
| 11,062,351 | B1* | 7/2021 | Holtan ............... G06Q 30/0251 |
| 2002/0099600 | A1 | 7/2002 | Merriman et al. |
| 2003/0182250 | A1 | 9/2003 | Shihidehpour et al. |
| 2004/0254857 | A1* | 12/2004 | Onizuka ............ G06Q 30/0601 705/26.1 |
| 2004/0267806 | A1 | 12/2004 | Lester |
| 2005/0021403 | A1 | 1/2005 | Ozer et al. |
| 2006/0271389 | A1 | 11/2006 | Goodman |
| 2007/0011078 | A1* | 1/2007 | Jain ........................ G06Q 40/04 705/37 |
| 2007/0153737 | A1 | 7/2007 | Singh et al. |
| 2008/0046316 | A1 | 2/2008 | Shah et al. |
| 2008/0065479 | A1* | 3/2008 | Tomlin .................... G06Q 30/02 705/14.43 |
| 2008/0154858 | A1 | 6/2008 | Manavoglu et al. |
| 2008/0249991 | A1* | 10/2008 | Valz ..................... G06F 16/9535 |
| 2008/0263578 | A1 | 10/2008 | Bayer et al. |
| 2008/0281676 | A1* | 11/2008 | Stahura .............. G06Q 30/0201 705/7.29 |
| 2009/0119172 | A1 | 5/2009 | Soloff |
| 2009/0132363 | A1 | 5/2009 | Powell et al. |
| 2009/0171721 | A1 | 7/2009 | LeBaron et al. |
| 2010/0257053 | A1 | 10/2010 | Ferber et al. |
| 2011/0282751 | A1 | 11/2011 | Kwon et al. |
| 2012/0130798 | A1 | 5/2012 | Cooley et al. |
| 2012/0130829 | A1* | 5/2012 | Roth ...................... G06Q 30/02 705/14.71 |

OTHER PUBLICATIONS

Wiggins, Ralphe and John A. Tomlin. "Bid Optimization for Internet Graphical Ad Auction Systems via Special Ordered Sets," YAHOO! Research, Technical Report, YR-2007-004, (Apr. 30, 2007). (Year: 2007).*

Liu, Weiguo et al. "Online Advertisement Campaign Optimization," IEEE International Conference on Service Operations and Logistics, and Informatics (Aug. 1, 2007), pp. 1-4. (Year: 2007).*

Ali Nasiri Amin et al., U.S. Appl. No. 11/819,058 for "Adaptive Lag Compensated Prediction of Future Success Rate," filed Jun. 25, 2007.

"BidAnalyzer: A Method for Estimation and Selection of Dynamic Bidding Models"; Marketing Science; vol. 27, No. 6, Nov.-Dec. 2008, pp. 949-960.

Estimating Stochastic Volatility Option Pricing Models with Kalman Filtering; Department of Accounting and Finance, Monash University, Australia; Feb. 20, 2008.

Phelim P. Boyle and Ton Vorst "Option Replication in Discrete Time with Transaction Costs"; The Journal of Finance, vol. 47, No. 1 (Mar. 1992) pp. 271-293.

Holtan, Hans Marius, U.S. Appl. No. 11/984,244 for "Systems and Methods for Allocating Electronic Advertising Opportunities," filed Nov. 15, 2007.

AdSense, <https://www.google.com/adsense/www/en_US/adsense_application.html>, printed from the Internet on Nov. 15, 2007.

Quigo Technologies, Inc., AdSonar, worldwide web, http://quigo.com/asfa.htm, printed from the Internet on Nov. 8, 2007.

Right Media <http://www.rightmedia.com>, printed from the Internet on Nov. 8, 2007.

\* cited by examiner

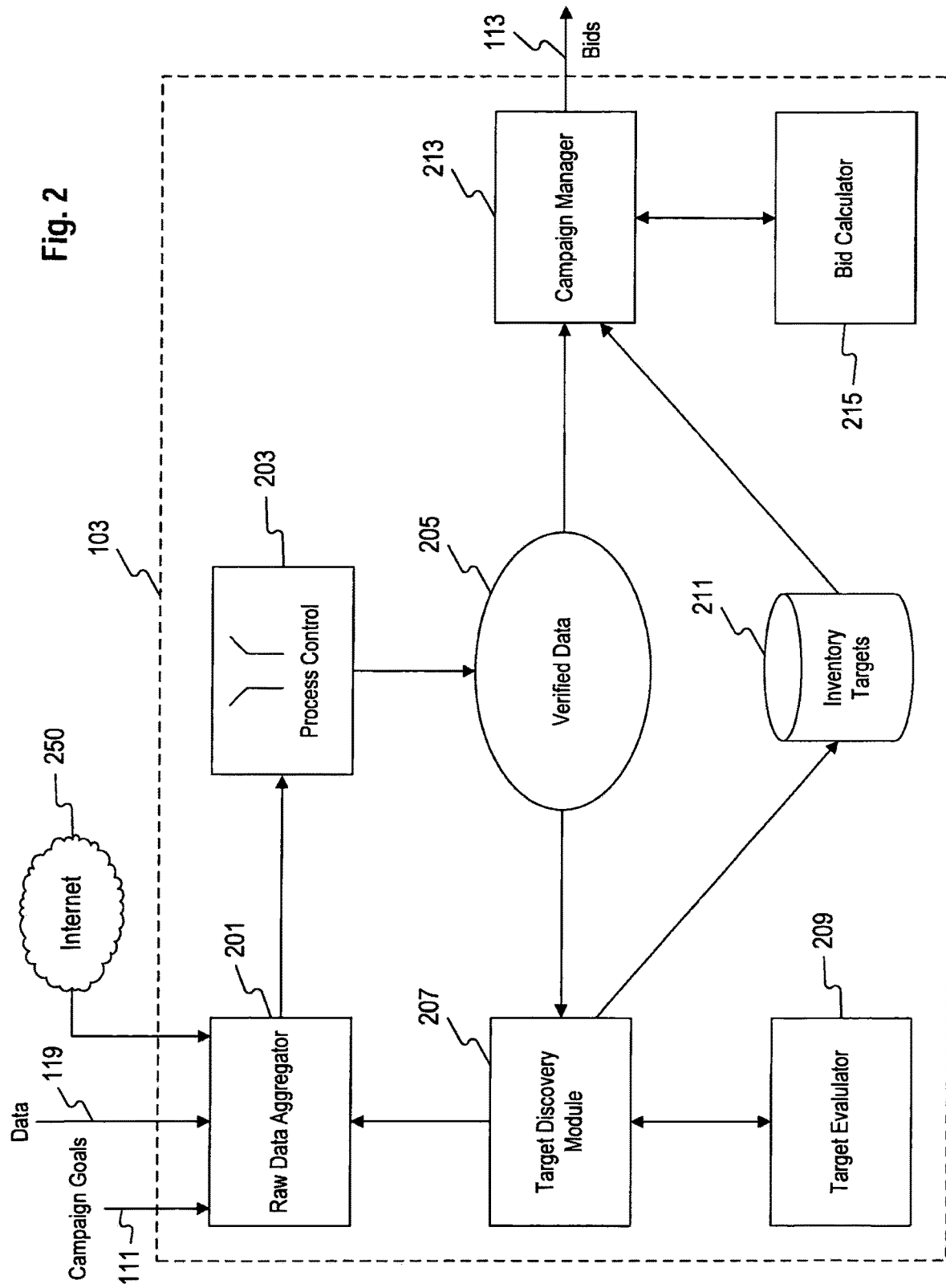

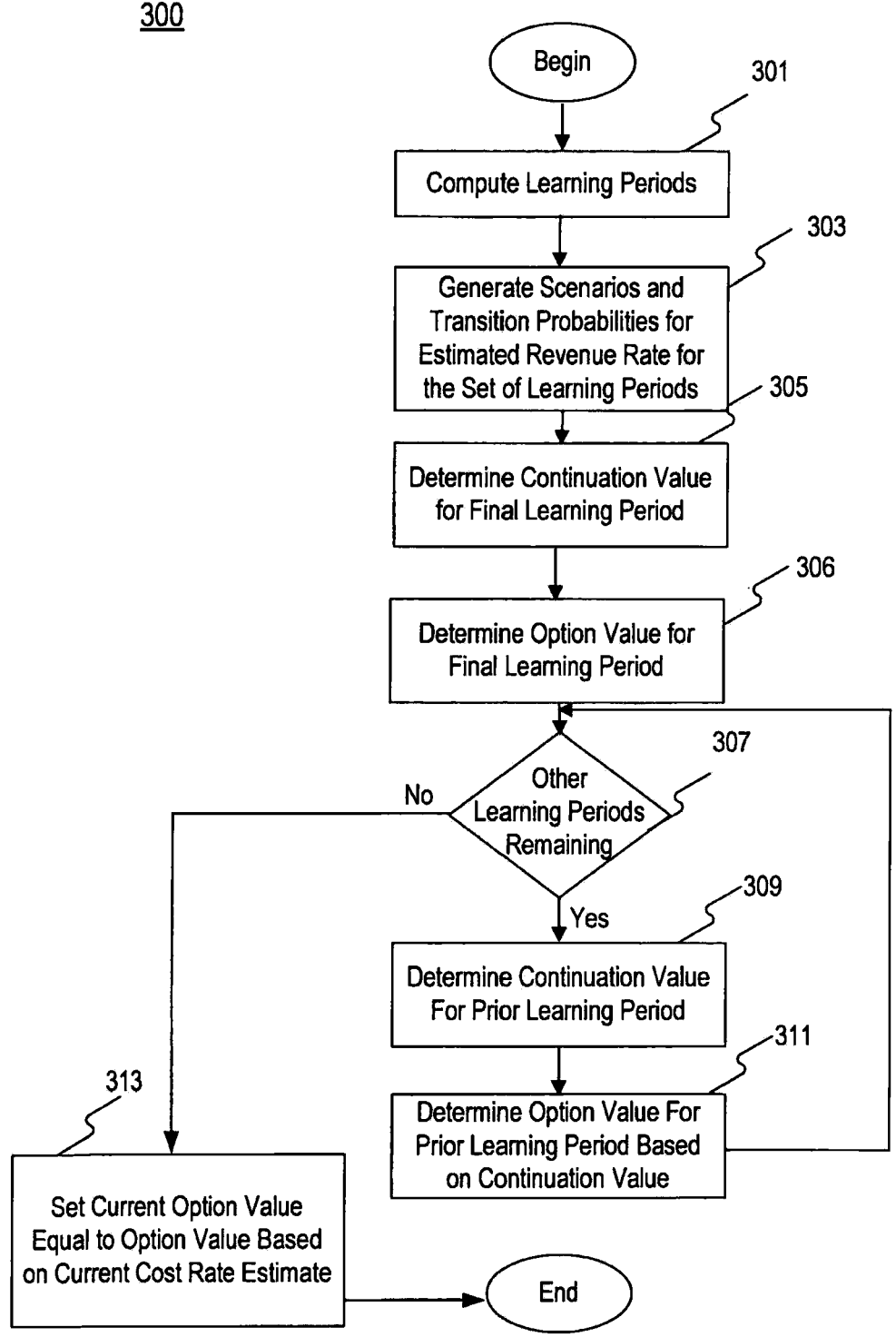

SYSTEMS AND METHODS FOR DETERMINING BIDS FOR PLACING ADVERTISEMENTS

This application is a continuation of pending prior U.S. patent application Ser. No. 13/465,568 (allowed), filed May 7, 2012, which is a continuation of U.S. patent application Ser. No. 12/314,323 (now U.S. Pat. No. 8,175,950) filed Dec. 8, 2008. The disclosures of the above-referenced applications are expressly incorporated herein by reference to their entireties.

FIELD OF THE INVENTION

Principles consistent with embodiments of the present invention relate to facilitating the interaction of parties engaged in electronic market transactions, and more specifically, to calculating a bid price for advertising space available on an electronic medium.

BACKGROUND OF THE INVENTION

Since the early 1990's, the number of people using the World Wide Web has grown at a substantial rate. As more users take advantage of the World Wide Web, higher volumes of traffic are generated over the Internet. Because the benefits of commercializing the Internet to take advantage of these higher traffic volumes can be tremendous, businesses increasingly seek means to advertise their products or services on-line. These advertisements may appear, for example, in the form of leased advertising space (e.g., "banners") on websites or as advertisements presented to digital television users, which are comparable to rented billboard space or to commercials broadcasted during television or radio programs.

When a company advertises on a website, it may benefit from the volume of advertisements or impressions that it places on the website, the number of users that select or "click" on each advertisement, and the number of sales or other "conversions" that result from each display of an advertisement. Each instance that an advertisement is placed on a web page may be referred to as an "impression." Companies may pay per impression, per click, and/or per conversion, regardless of whether or not the action for which they are paying (e.g., impressions, clicks, etc.) is the action that benefits them. Therefore, in addition to wanting to predict impressions, clicks, and conversions, a company may want to determine a bid price, which represents the highest price that the company is willing to pay for placing an advertisement on a website. The determination of a bid price may help companies, and those obtaining advertising space on their behalf, to assess the potential benefit of placing a particular advertisement on a particular web page. Accordingly, companies have a need to determine bid prices for placing advertisements on web pages.

It is accordingly an object to overcome the shortcomings of current techniques for pricing bids.

SUMMARY OF THE INVENTION

Certain embodiments of the present invention disclose methods for determining a bid price of an advertisement by dividing a time period beginning at an initial time into a set of learning periods associated with the advertisement and generating a set of expected revenue rates for the set of learning periods. A cost for placing the advertisement in the learning period starting at the initial time is estimated and a current option value is determined based on the estimated cost. The current option value is determined by, for a final learning period in the set of learning periods, determining a continuation value representing the expected profit over the final learning period and an option value representing a value of the option to stop placing the advertisement at the beginning of the final learning period. Starting with a learning period just prior to the final learning period, a continuation value is determined representing a value of continuing to place the advertisement, the continuation value based on the expected revenue rate for the learning period and the continuation values of later learning periods and an option value is determined representing a value of the option to stop placing the advertisement at the beginning of the learning period, the option value based on the continuation value for the learning period. These steps are repeated for each prior learning period until an option value is determined for the learning period starting at the initial time. A current option value equal to the option value is determined for the learning period starting at the initial time, and if the current option value is not zero, the estimated cost is adjusted and the process is repeated. If the current option value is zero, the bid price is set equal to the estimated cost and submitted to an advertising exchange that places online advertising.

In other embodiments, a method is disclosed for determining a bid price of an advertisement by dividing a time period beginning at an initial time into a set of learning periods associated with the advertisement and generating a set of possible expected revenue rates for each learning period in the set of learning periods. A cost for placing the advertisement is estimated and a current option value for the initial learning period is determined based on the estimated cost by recursively determining, for each learning period beginning with a final learning period in the set of learning periods, a continuation value associated with the expected revenue rate for the learning period and the continuation values of later learning periods, and an option value, based on the continuation value, associated with an option to stop placement of the advertisement in the learning period. Until the current option is zero, the estimated cost is adjusted and the determination is repeated. When the current option value is zero, the bid price is set equal to the estimated cost and submitted to an advertising exchange that places online advertising.

In still other embodiments of the invention, a bid calculating apparatus is disclosed for determining a bid price of an advertisement. The bid calculating apparatus comprises a learning period module configured to divide a time period beginning at an initial time into a set of learning periods associated with the advertisement. The bid calculating apparatus further comprises a lattice module configured to generate a set of expected revenue rates for each learning period in the set of learning periods and determine a current option value for the initial learning period based on the estimated cost by recursively determining, for each learning period beginning with a final learning period in the set of learning periods. This is done by determining a continuation value associated with the expected revenue rate for the learning period and the continuation values of later learning periods, and an option value, based on the continuation value, associated with an option to stop placement of the advertisement in the learning period. The bid calculating apparatus further comprises a bid generator configured to determine whether the current option value is zero, adjust the estimated cost and direct the lattice module to repeat the determining function, when it is determined that the current option value is not zero, and set the bid price equal to the estimated cost, when it is determined that the current option value is zero.

BRIEF DESCRIPTION OF THE DRAWINGS

FIG. 2 shows a block diagram of an exemplary campaign optimizer for managing advertising campaigns, consistent with an embodiment of the present invention.

FIGS. 3A-3B show an exemplary process for determining a bid based on an option price consistent with an embodiment the present invention.

DESCRIPTION OF THE EMBODIMENTS

Figure 1:
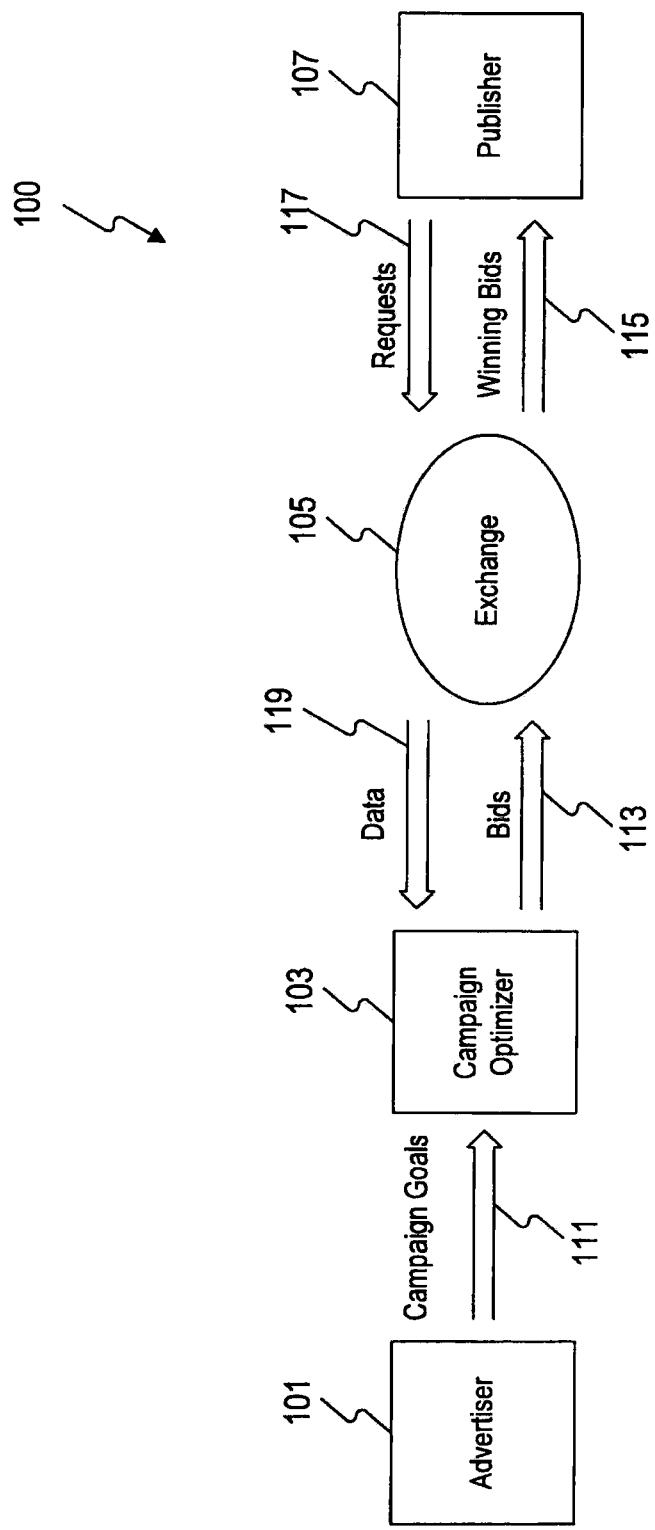
FIG. 1 shows a block diagram of a system that provides a marketplace for advertising inventory, consistent with an embodiment of the present invention.

Reference will now be made in detail to exemplary embodiments of the invention, examples of which are illustrated in the accompanying drawings. Wherever possible, the same reference numbers will be used throughout the drawings to refer to the same or like parts.

A company may determine a bid price using at least two elements. First, the company may calculate the bid price based on the short term profit that it expects to receive when placing the advertisement on a web page. The expected short term profit due to placing an advertisement on a web page may be calculated, for example, using the number of conversions that result after placing the advertisement. Determining short term profits due to placing an advertisement may take into account additional factors, such as the time lag between a successful sale or conversion and the impression that resulted in the sale or conversion. Taking the time lag into account when calculating conversions is discussed in U.S. Provisional patent application Ser. No. 11/819,058, entitled "Adaptive Lag Compensated Prediction of Future Success Rate" and filed on Jun. 25, 2007, which is incorporated herein in its entirety by reference.

Second, a company may base its bid price on a learning value. The learning value represents the additional price that the company is willing to pay to better estimate the expected revenue of maintaining the advertisement on the web page. Although the company may not be able to calculate the expected revenue with certainty, the additional data received by maintaining the advertisement on the web page may help the company to improve its expected revenue calculation. In some instances, a company may make trade-offs between the expected short term profit and the learning value. For example, a company may accept short term losses to learn if maintaining an advertisement on a web page may result in future profits.

One problem with determining the bid price for placing an advertisement on a web page relates to determining of the learning value. For example, the learning value may lack a forward-looking component that takes future events into account when calculating the bid price. Instead of using a forward looking component, the learning value may be based on the variance in revenue, but the revenue variance may be calculated using only revenue data collected during one or more previous time periods. Accordingly, using only prior event data such as the revenue variance to calculate the learning value fails to take into account future events that may also have an impact on the learning value. For example, as the end-of-life of the advertisement approaches, and the advertisement is soon to be removed from the web page, the learning value of the bid price may be dramatically reduced. Embodiments consistent with the present invention, however, may be used to calculate a bid price that takes future events into account.

Consistent with certain embodiments, a process may be performed using these inputs and parameters:

| Symbol | Description |
| --- | --- |
| $\hat{r}$ | Current estimate of the effective revenue rate per impression. |
| $K_0$ | Variance of $\hat{r}$. |
| R | Variance of the measurement noise per impression. |
| T | Time remaining for a cell. |
| $\mu$ | Discount factor. |
| $\delta$ | Variance reduction parameter. |
| $\gamma$ | Variance tolerance parameter. |
| $\theta$ | Bisection tolerance parameter |

Additional variable notations used in this document include:

| Symbol | Description |
| --- | --- |
| c | Cost rate per impression. |
| N | Number of learning periods. |
| $\Delta_i$ | Length of learning period i. |
| $t_i$ | Start time of learning period i. |
| $K_i$ | Variance of the revenue rate at $t_i$. |
| $\hat{r}_i^j$ | Revenue rate scenario at time $t_i$. |
| $p_i^{j,k}$ | Transition probability from $\hat{r}_i^j$ to $\hat{r}_{i+1}^k$. |
| $V_i^j$ | Option value scenario at time $t_i$. |

The effective revenue rate may represent an impression weighted average of the revenue rates. A "cell" may correspond to a slot for placing a particular advertisement at a particular place and time. For example, a slot for presenting a clickable internet advertisement for a discount brokerage firm (the particular ad) on a Yahoo Finance client's Internet browser (a particular network segment) may correspond to a cell. An impression may occur when the advertisement is placed in a cell and presented at the particular place and time. Each cell may be part of a campaign of cells—an advertising campaign. For example, an automobile company may launch a number of advertisements, each corresponding to one or more cells, when it introduces a new car. The related advertisements may be part of the same campaign, and the cells related to the advertisements may be "peers" of each other. Any number of campaigns may be considered together in groups and the cells related to those campaigns may be considered peers of one another.

FIG. 1 shows a block diagram of a system for providing an electronic marketplace for advertising inventory consistent with an embodiment of the present invention. Marketplace 100 may include advertiser 101, campaign optimizer 103, exchange 105, and publisher 107. Advertiser 101 may have an advertising campaign and wish to purchase one or more cells on a web page to display the campaign advertisements. Further, as part of its advertising campaign, advertiser 101 may develop one or more campaign goals 111. A campaign goal may describe one or more metrics, such as profitability and cost, that are to be maximized or minimized during the campaign. A campaign goal may include a list of delivery terms for the campaign to indicate preferences and/or tolerances of advertiser 101. For example, advertiser 101 may include a delivery term to instruct that no more than $1,000 per month should be expended during the advertising campaign.

Advertiser 101 may send campaign goals 111 to campaign optimizer 103. Campaign optimizer 103 may use campaign goals 111 to formulate a bidding strategy for the advertising campaign. For example, campaign optimizer 103 may use campaign goals 111 to determine the web pages or types of web pages to target for placing advertisements. The group of targeted web pages for an advertising campaign by advertiser 101 may be referred to as a target inventory. Bids 113 may identify the target inventory by listing specific web pages and/or by describing the page characteristics of the types of web pages on which advertiser 101 would like to place advertisements. The page characteristics may include, for example, statistics regarding the viewers of the web page and the number of times the web page is loaded. As part of the bidding process, campaign optimizer 103 may repeatedly or continually submit bids 113 to exchange 105. A bid 113 may describe the target inventory of web pages for the advertising campaign as well as specify the maximum price per advertising request and the maximum request volume that advertiser 101 desires for the advertising campaign.

Publisher 107 may control inventory on one or more web pages that are available for displaying advertisements. Publisher 107 may send requests 117 to exchange 105 to inform exchange 105 of the available inventory. Further, publisher 107 may maintain statistics and demographic data regarding the web pages containing the available inventory. For example, publisher 107 may maintain statistics regarding the average number of impressions per hour, for each hour of the day, that were created in the past week on a web page containing the available inventory.

Further, publisher 107 may maintain demographic data regarding the web pages containing the available inventory, demographic data that may include, for example, the percentage of impressions created for people within specified age brackets, within certain geographic regions, or within defined income levels. Further, publisher 107 may include usage information within request 117, such as a base price for the inventory on a web page, below which publisher 107 is unwilling to vend the inventory.

The usage information may also indicate an advertising period [0, T], which represents the period of time advertisements are to be placed in the inventory. Further, in some embodiments, publisher 107 may indicate that an advertisement may be removed from a web page before the end of the advertising period. Publisher 107 may provide the statistical, demographic, and usage data to exchange 105 as part of request 117. Additionally, the data from publisher 107 may be used by campaign optimizer 103 to formulate future bids.

Exchange 105 facilitates the placement of advertisements from advertiser 101 onto cells provided by publisher 107 by matching bids 113 with requests 117. When request 117 for advertising space arrives from publisher 107, exchange 105 may identify all bids 113 that have listed the web page of request 117 within a target inventory. Exchange 105 may then choose the winning bids that will receive at least some of the advertising space offered by request 117. A manner in which exchange 105 may choose the winning bid is described in co-pending U.S. patent application Ser. No. 11/984,244, entitled Systems and Methods for Allocating Electronic Advertising Opportunities and filed on Nov. 15, 2007, which is incorporated herein by reference in its entirety. Exchange 105 may continuously receive requests 117 from publisher 107 and match requests 117 to bids 113. Finally, exchange 105 may notify advertiser 101 and publisher 107 of the winning bids. Further, exchange 105 may provide data 119 to campaign optimizer 103 and advertiser 101. For example, exchange 105 may include the demographic and statistical data received from publisher 107 as part of data 119.

FIG. 2 shows a block diagram of an exemplary campaign optimizer for managing advertising campaigns consistent with an embodiment of the present invention. In the exemplary embodiment disclosed in FIG. 2, campaign optimizer 103 may include raw data aggregator 201, process control 203, verified data storage 205, target discovery module 207, target evaluator 209, inventory target database 211, campaign manager 213, and bid calculator 215. A skilled artisan will recognize that the components of campaign optimizer 103 may be combined or separated in ways other than the embodiment depicted in FIG. 2. Further, in some embodiments, each of the components of campaign optimizer 103 may be included on the same electronic device. Alternatively, the components of exemplary campaign optimizer 103 shown in FIG. 2 may be implemented on two or more electronic devices. Further, when multiple electronic devices are used to implement campaign optimizer 103, the separate electronic devices may be controlled by different entities. For example, in some embodiments, campaign manager 213 and bid calculator 215 may be implemented on one electronic device controlled by advertiser 101 while the remaining components of campaign optimizer 103 may be implemented on a different electronic device controlled by a third party separate from advertiser 101 and publisher 107.

Raw data aggregator 201 accepts as input campaign goals 111 from advertiser 101 and data 119 from exchange 105. In addition, raw data aggregator 201 may accept data from the Internet 250. In some embodiments, raw data aggregator 201 may accept a continuous data flow from any or all of advertiser 101, exchange 105, publisher 107, and Internet 250. Raw data aggregator 201 may use instructions received from target discovery module 207 to parse and aggregate the received data. The instructions received from target discovery module 207 may identify, for example, the target web pages on which advertiser 101 may be interested in placing advertisements. By parsing and aggregating the received data, raw data aggregator 201 may output to process control 203 a collection of discrete-time signals containing data about the target web pages.

Process control 203 may be used to detect issues or problems with received data signals. Issues or problems that are left unattended might severely impact the ability of campaign optimizer 103 to bid on available advertising cells and to achieve campaign goals 111. To prevent issues and problems from being left unattended, process control 203 may be used to determine if a signal, such as a signal representing campaign goals 111 and data 119, is behaving normally (i.e., is in control) or if the signal is exhibiting unusual behavior (i.e., is out of control). If a signal is out of control, then the ability of campaign optimizer 103 to function properly may be affected. For example, if problems arise with the values in data 119 causing the related signal to be out of control, then campaign optimizer 103 may calculate and submit bids requesting the wrong number of cells or with bid prices that are too high. Accordingly, process control 203 may be used to search for signals that are out of control and warn those components of campaign optimizer 103 that may be adversely effected.

Process control 203 may also be used to detect other failures in the received signals. When process control 203 detects a failure, then it may take an appropriate preventative or corrective action. For example, process control 203 may prevent further bids 113 from being submitted when it detects a failure. If process control 203 has verified that a signal is in control, then it may process the data from the signal. Process control 203 may also pass the data to verified data storage 205.

Process control 203 may use the parsed data received from raw data aggregator 201 to compute the effective revenue rate for a web page. Process control 203 may estimate the effective revenue rate, ř, as:

$$\check{r} = C\rho,$$

where C represents the revenue per successful transaction (e.g. a sale) and ρ represents an estimate of the conversion rate of successful transactions per impression. Accordingly, the effective revenue rate ř may have units of revenue per impression. As an example, process control 203 may have calculated the revenue per successful transaction to be $50 and the conversion rate to be 1 successful transaction for every 10,000 impressions. In this example, the estimate of the effective revenue rate, ř, would equal $0.0050 per impression.

Process control 203 may use the captured raw data to determine the variance, $K_0$, of the fundamental revenue rate. To do so, process control 203 may set the variance to equal:

$$K_0 = C^2 Q$$

where Q equals the current estimate of the variance of ρ. As an example, process control 203 may have determined that the variance of ρ equals to 0.000001. Keeping the revenue per successful transaction equal to $50, process control 203 may calculate the variance $K_0$ to equal 0.0025.

In certain embodiments, process control 203 may use the parsed data to estimate ř and $K_0$ by state space modeling and Kalman filtering. The state space model could be based on a model for the observed revenue rate per impression y for a period of time Δ such as:

$$y_{t+\Delta} = r + v_{t,\Delta}$$

where r equals the true, unknown revenue rate per impression and $v_{t,\Delta}$ represents the measurement noise at time t over the interval Δ. Kalman filtering may be used to compute ř and $K_0$, the estimate of r and its variance, respectively.

Process control 203 may use the parsed data to determine the measurement noise for the observed revenue rate of a cell. The measurement noise may take into account the volatility of the revenue observed for a set of impressions for a given revenue rate for a web page created over period of time. Raw data aggregator 201 may calculate the variance of the measurement noise, R, given the impressions and the estimated revenue rate. In some embodiments, the value of the variance of the measurement noise may equal:

$$R = \frac{C\check{r}}{\eta_a}$$

In this equation, $\eta_a$ may represent the set of available impressions for the web page for a given advertiser for a unit of time.

Process control 203 may use the parsed data to determine a discount factor for the future expected revenue. Process control 203 may calculate the discount factor, μ, based on a combination of a riskless interest rate and a hazard rate associated with the advertisement being prematurely removed from the web page before the scheduled end time.

The risk free interest rate, $\mu_r$, may equal the interest rate on a theoretically risk-free bond that matures at time T, the same time that the advertisement is scheduled to be removed from the web page. This interest rate may be based on the interest rate of a low-risk investment, such as a U.S. Treasury bond, that is set to mature at time T. The hazard rate, $\mu_m$, may be used to take into account the unexpected and premature removal of the advertisement from the web page. Raw data aggregator 201 may model this event as a random variable with an exponential distribution of rate $\mu_m$. A premature removal may occur, for example, when a web page is removed from the Internet. In some embodiments, process control 203 may set the discount factor, μ, to equal:

$$\mu = \mu_r + \mu_m$$

As an example of calculating the discount factor, process control 203 may determine that the interest rate on a low-risk 30-day bond equals 0.00005125 (0.005125%). Process control 203 may set $\mu_r$, the risk free interest rate, equal to 0.00005. Further, process control 203 may model the premature removal of an advertisement from a web page as an exponential distribution with a hazard rate, $\mu_m$, of 0.001. Accordingly, raw data aggregator may set the discount factor μ to equal 0.00105. Process control 203 may transmit some or all of the calculated values and the parsed data to verified data storage 205.

Target discovery module 207, may use the data in verified data storage 205 to determine all web pages that have the same, or a similar, level of performance for an advertising campaign. The level of performance may be measured by some metric such as revenue per impression. Further, target discovery module 207 may be implemented by advertiser 101 or by a third party. The target web pages identified by discovery module 207 may be different than the web pages for which advertiser 101 is currently bidding.

To determine a list of target web pages, some embodiments of target discovery module 207 may first decide on the web pages for which it desires data. Target discovery module 207 may make this decision based on one or more of performance metrics, demographic data, and statistical data of a web page. After target discovery module 207 identifies targets that have a desired level of performance for an advertising campaign, it may then proceed to obtain information regarding the targets by transmitting instructions to raw data aggregator 201. Raw data aggregator 201, as discussed previously, may monitor and record data signals involving the targets. Signals and data involving the target web pages may be transmitted from raw data aggregator 201 via process control 203 to target discovery module 207. Target discovery module 207 may pass the recorded signals and data to target evaluator 209.

Target evaluator 209 may accept the signals and data involving the set of targets from target discovery module 207 for analysis. Target evaluator 209 may divide the targets into different sets according, for example, to an evaluation of how well each target performs, or may perform, in an advertising campaign. Moreover, target evaluator 209 may have a goal of identifying those targets that perform above a certain level in an advertising campaign, as measured by one or more metrics, such as, for example, the number of impressions, clicks, and/or conversions. Further, target evaluator 209 may have a goal of ranking each target according to a specified metric and identifying a certain number of targets according to the rankings. For example, target evaluator 209 may rank the targets according to the number of clicks and identify the ten targets with the most clicks. After target evaluator 209 has identified one or more target web pages, it may pass the identified target web pages to target discovery module 207 which may store the identified targets in inventory targets database 211 as target inventory.

Campaign manager 213 may be used to achieve campaign goals 111 of advertiser 101. Campaign manager 213 may accept as input campaign goals 111, verified data 205, and one or more target inventories from inventory targets database 211. In some embodiments, campaign manager 213 may use the input data to calculate control information for bid calculator 215. The control information may also include the preference and/or tolerance levels for an advertising campaign that advertiser 101 transmitted as part of campaign goals 111. Campaign manager 213 may further use the data in verified data storage 205 to set the value for one or more controls. By manipulating the control information, campaign manager 213 may influence the bid prices determined by bid calculator 215 for available advertising space. Campaign manager 213 may set the control information based in part on the information transmitted with campaign goals 111. After campaign manager 213 has determined the appropriate value for each control, it may then pass some or all of the controls, verified data, and target web pages to bid calculator 215. After bid calculator 215 determines the bid, it may transmit the bid to campaign manager 213 which may then submit it as bid 113 to exchange 105.

The processing of bid 113 by exchange 105 may be used as part of a positive feedback loop for optimizing bids 113 submitted to exchange 105. For example, the processing of bids 113 by exchange 105 may provide additional data 119 that can be transmitted to and collected by raw data aggregator 201. After processing by process control 203, the additional data 119 may influence a later bid price calculated by bid calculator 215 and submitted to exchange 105. Accordingly, using the additional data received from exchange 105, campaign optimizer 103 may manipulate the controls passed to bid calculator 215 to optimize the value of bids 113.

Bid calculator 215 may calculate bid values for placing advertisements onto a target web page. In certain embodiments, the bid value for placing an advertisement on a web page may be defined as the highest charge that advertiser 101 is willing to pay for placing the advertisement on a target web page. Bid calculator 215 may receive as input from campaign manager 213 tolerance and/or preference information of advertiser 101. Bid calculator 215 may also receive as input from campaign manager 213 verified data from verified data storage 205. Bid calculator 215 may use some or all of the tolerance and/or preference indications, and the verified data to calculate a bid for the target. Bid calculator 215 may also use verified data from verified data storage 205 to determine the bid. Bid calculator 205 may output a bid value to campaign manager 213.

To compute the bid value, bid calculator 215 may first determine an equation to value the option of placing an advertisement on a target web page. Bid calculator 215 may calculate the option value based on the short-term expected profits that advertiser 101 expects to receive, given its current knowledge, from placing the advertisement on the target during advertising period [0, T]. Additionally or alternatively, bid calculator 215 may calculate the option value based on the learning value, the additional price that advertiser 101 is willing to pay to obtain a better estimate of its expected revenue if it maintains the advertisement on the web page. Bid calculator 215 may base the learning value, in part, on the expected value of maintaining the advertisement after the current learning period ends.

The value of maintaining the advertisement for a learning period that begins at time k may be referred to as the continuation value, $C_k$, of the advertisement at time k. The continuation value at any time k is a function of the future state of knowledge at time k. The continuation value of an advertisement for a learning period may include the expected profit of the advertisement for that learning period and an expected value for the advertisement at the end of that learning period, where the expectations are a function of the state of knowledge at the beginning of the learning period. Bid calculator 215 may determine the expected profit by determining the expected revenue and then subtracting costs. For example, the expected profit component of a continuation value for a learning period beginning at time k may equal:

$$P_k(\psi,c)=E(R_k(\psi))-c$$

where $\psi$ is any of the possible states of knowledge at time k.

In certain embodiments, in addition to the expected profit component for a time period, the continuation value may also contain a future value component that represents the value of maintaining the advertisement at the end of the learning period. When determining the future value component of the advertisement at the end of a learning period, bid calculator 215 may estimate the option value of the advertisement as a function of the possible states of knowledge occurring at the end of that learning period. Conditioned on the state of knowledge at the beginning of a learning period, the bid calculator may then compute the expectation of the option value over the possible states of knowledge at the end of the learning period. In some embodiments, the expected value of an advertisement after the current learning period may be discounted to a present day value when determining the option value at the beginning of the current learning period. Accordingly, the future value component of the continuation value may be:

$$F_k(\psi,c)=e^{-\mu}E[V_{k+1}(\psi_{k+1},c)|\psi_k=\psi]$$

where $\psi$ represents any of the possible states of knowledge at time k.

Bid calculator 215 may then sum the expected profit and future value components together to determine the continuation value of a learning period. Thus, bid calculator 215 may determine the continuation value of a learning period beginning at time k as:

$$C_k(\psi,c)=P_k(\psi,c)+F_k(\psi c)=E(R(\psi))-c+e^{-\mu}E[V_{k+1}(\psi_{k+1},c)|\psi_k=\psi]$$

Moreover, because the expected value at the end of the last learning period equals zero, the continuation value for the last learning period may equal the expected profit for that time period:

$$C_{T-1}(\psi,c)=E(R(\psi))-c$$

for any state $\psi$.

After the continuation value, $C_k$, at time k has been determined, bid calculator 215 may determine the option value for any state at time k by comparing the value of $C_k$ to the option value of removing the advertisement at time k. As an example, bid calculator 215 may set the option value of a removed advertisement equal to zero. Accordingly, in this example, bid calculator 215 may set the option value at any point in time k to equal:

$$V_k(\psi,c)=\max\{0,C_k(\psi,c)\}$$

Figure 3B:
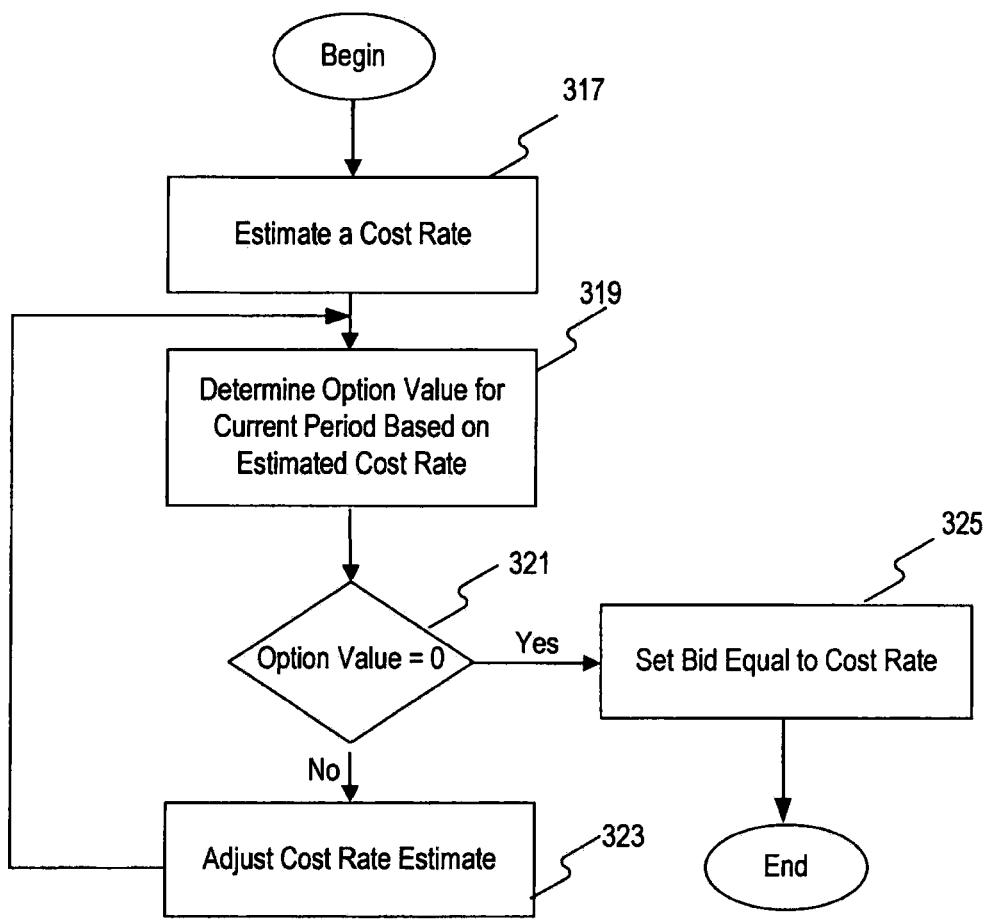

FIGS. 3A-3B show an exemplary process 300 for determining a bid based on an option price consistent with an embodiment the present invention. The determined bid represents an amount an advertiser is willing to pay for the available inventory on a website. In the embodiment of FIGS. 3A-3B, to determine the bid, process 300 first values the option to place an advertisement on the website. Process 300 then searches for a cost rate at which the option value is zero, and sets the bid equal to that cost rate. Process 300 may be performed, for example, by bid calculator 215.

In FIG. 3A, a current option value is determined. The current option value may take into account the ability to remove an advertisement before the end of advertising period [0, T]. For example, process 300 may model the state of knowledge as a Markov decision process over a finite time period, [0, T] to determine the option value for maintaining an advertisement at any point in time based only upon the knowledge at that time.

Process 300 begins by computing learning periods over time period [0, T] (step 301). One or more points may exist within the advertising period [0, T] at which the advertisement may be removed from the target web page. Accordingly, the time period [0, T] may be composed of one or more periods, called learning periods. The beginning of each learning period may correspond to one of the points at which campaign manager 213 may remove the advertisement from the target web page. The first learning period may begin at time 0, while the last learning period may begin at time T−1. If the advertisement is removed from the web page, however, then bid calculator 215 may receive no further information regarding the revenue rate of the advertisement. Accordingly, when bid calculator 215 receives no further information after an advertisement is removed, the removal of an advertisement from the target web page may be considered to be permanent when computing bid values.

When the advertisement may be permanently removed from the web page, bid calculator 215 may determine a stopping time for the advertisement. Bid calculator 215 may use the determined stopping time for an advertisement when calculating the option value of the advertisement. The stopping time represents a random variable that depends upon the expectations of bid calculator 215, given its current knowledge, regarding the future revenue of maintaining the advertisement on the target web page.

Moreover, an optimal stopping time $\tau$ may exist at which the revenues received from placing the advertisement on the target web page are maximized. Some embodiments of bid calculator 215 may determine that the optimal stopping time occurs when the option value $V_0$ satisfies the following equation:

$$V_0(\psi_0, c) = \sup_{\tau \in \Gamma} E\left[\sum_{k=0}^{\tau-1} e^{-\mu k}(R(\psi_k) - c) \mid \psi_0\right]$$

In this equation:
 $\psi_k$ is the knowledge of advertiser 101 at time instance k;
 $\Gamma$ is the set of admissible stopping times within the period [0, T];
 c is the fixed cost of placing the advertisement on the web page in the given time period; and
 R( ) is the random revenue as a function of the knowledge of advertiser 101.

To solve the equation for the option value $V_0$, bid calculator 215 may use a series of comparisons between the values of maintaining and removing the advertisement at the beginning of each learning period. Further, bid calculator 215 may use this series of comparisons to define the stopping time in terms of a stopping condition. For example, the stopping time $\tau$ may be defined as the time at which the value ($V_k$) of maintaining the advertisement on the web page at time t=k is less than the value of removing the advertisement.

Once the learning periods have been computed (step 301), process 300 generates scenarios and transition probabilities for an estimated revenue rate for the set of learning periods (step 305). To generate scenarios of the estimates of revenue rates through the set of learning periods, bid calculator 215 may represent the state of the knowledge at time t by $\psi_t = (\check{r}_t, K_t)$, with $\check{r}$ being the estimate of the unknown revenue rate and the K being the variance of this revenue rate estimate. When an advertisement is placed, the revenue rate per impression between t and t+Δ may be assumed to be of the form:

$$y_{t+\Delta} = r + v_{t,\Delta}$$

with r being a true revenue rate for an impression and $v_{t,\Delta}$ representing measurement noise with mean zero and variance R/Δ.

Because r is unknown, scenarios are generated based on the current estimate of the revenue rate $\check{r}_t$ and its variance $K_t$. Accordingly, bid calculator 215 may model the mean and variance of the future observed revenue rate at time t+Δ, conditional on the knowledge state at t, using the equations:

$$E[y_{t+\Delta} \mid \psi_t] = \check{r}_t$$

$$\mathrm{Var}[y_{t+\Delta} \mid \psi_t] = K_t + \frac{R}{\Delta}.$$

In these equations, $\psi_t = [\check{r}_t, K_t]$ represents the state of the estimates at time t.

Once the estimated revenue rate scenarios are generated, process 300 may begin determining a current option value by determining a continuation value for the final learning period, which may begin at time T−1 (steps 305-306). For the final learning period, the continuation value equals the expected profit for that time period:

$$C_{T-1}(\psi, c) = E(R(\psi)) - c$$

Process 300 then determines whether other learning periods remain (step 307) and, if so, determines the continuation value for the prior learning period (step 309). At any prior learning period, the continuation value may be found using the following equation:

$$C_k(\psi, c) = E(R(\psi)) - c + e^{-\mu} E[V_{k+1}(\psi_{k+1}, c) \mid \psi_k = \psi]$$

where $\kappa = 0, \ldots, T-2$. For learning periods prior to the final period, the continuation value also includes the expected value of the option at the end of the time period, discounted to the beginning of the period. So, an option value for the prior learning period is determined (step 311). The option value for a given state is determined using the following equation:

$$V_{T-1}(\Psi, c) = \max\{0, C_{T-1}(\Psi, c)\}$$

As long as other learning periods remain (step 307, YES), process 300 recursively determines continuation values and option values for each prior learning period (steps 309, 311). For example, process 300 would continue to the time period beginning with T−2 and determine $C_{T-2}$, the continuation value of the next to last learning period, using $V_{T-1}$ to determine the future value component of $C_{T-1}$. As stated above, the option value for the learning period beginning at time T−2 may equal:

$$V_{T-2}(\Psi,c) = \max\{0, C_{T-2}(\Psi,c)\}$$

Once the continuation and option values have been determined for each learning period, the current option value is set equal to the option value based on the current cost rate estimate (step 313). This current option value is used to determine when an estimated cost rate should be set as a bid, as shown in FIG. 3A and discussed in greater detail below.

Figure 4:
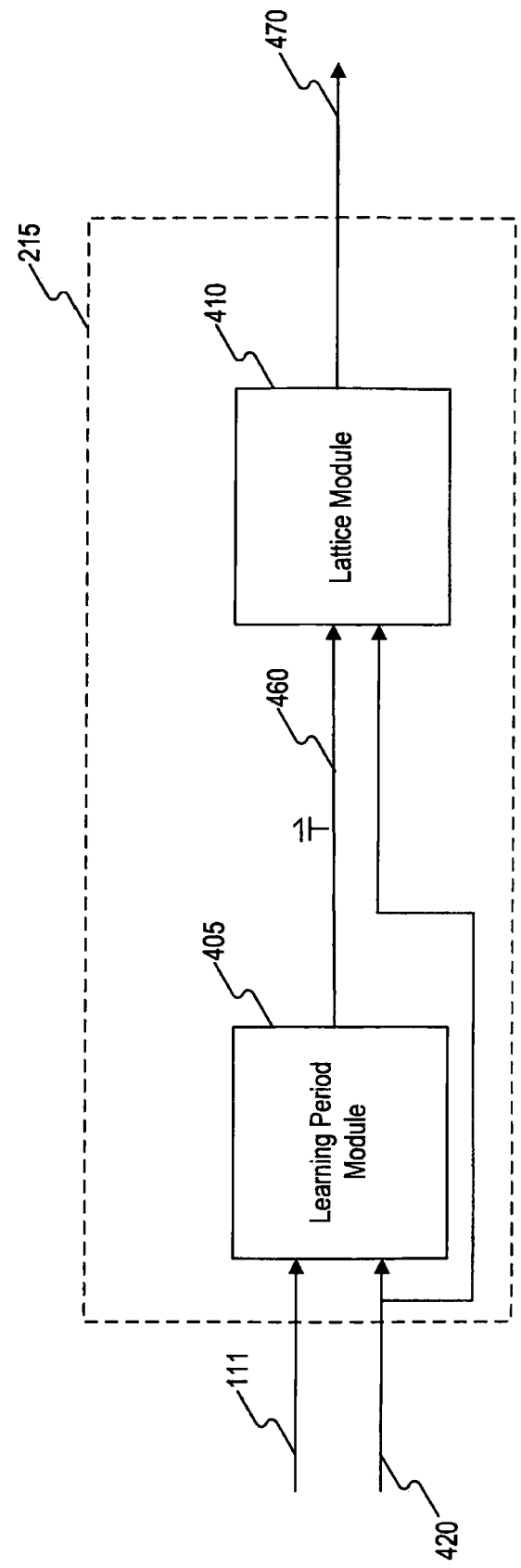
FIG. 4 shows an exemplary embodiment of a bid calculator consistent with an embodiment the present invention.

FIG. 4 shows an exemplary embodiment of a bid calculator consistent with an embodiment the present invention. Bid calculator 215 may perform some or all of the steps shown in FIGS. 3A-3B and may include learning period module 405 and lattice module 410. The exemplary embodiment of bid calculator 215 shown in FIG. 4 accepts as inputs campaign goals 111 from advertiser 101 and verified data 420 from verified data storage 205.

Learning period module 405 determines the length of each learning period within the time period [0, T] for which an advertisement may be placed on a web page. Time period [0, T] may contain one learning period or may include multiple learning periods. Learning period module 405 may accept as inputs campaign goals 111 and verified data 420 from verified data storage 205. Further, campaign goals 111 may include variance-reducing parameter $\delta$ and variance-tolerance parameter $\gamma$. Variance-reducing parameter $\delta$ may indicate a preference of advertiser 101 for reducing the variance K of the revenue rate estimate as the advertisement remains on a web page. The reduction of K may be a linear, geometric, or exponential reduction of the value of $K_0$, the variance at time 0. For example, in some embodiments, advertiser 101 may indicate a preference for reducing the variance K so that the variance of each learning period equals $(1-\delta)$ times the variance of the previous learning period. Accordingly, the variance K at the beginning of each learning period starting at time t=0 may be given by the geometric series Z: $K_0$, $(1-\delta) K_0$, $(1-\delta)^2 K_0$, etc. Variance tolerance parameter $\gamma$, may indicate the tolerance of advertiser 101 for the value of revenue rate variance $K_0$. Advertiser 101 that has a relatively high tolerance for the value of revenue rate variance $K_0$ may have a relatively higher value for variance tolerance parameter $\gamma$.

Learning period module 405 may determine the length of each learning period using the variance reducing parameter $\delta$. For example, bid calculator 215 may seek to reduce the variance in the expected revenue rate per impression according to the geometric series Z. When using the revenue rate model $y_{t+\Delta} = r + v_{t,\Delta}$ to determine the bid price, the Kalman update equation may be used to determine that the error variance for the next learning period equals:

$$K_{t+\Delta} = \frac{K_t \frac{R}{\Delta}}{K_t + \frac{R}{\Delta}}$$

Because the variance for each learning period equals to $(1-\delta)$ times the variance of the previous learning period, bid calculator 215 may set $K_{t+\Delta} = (1-\delta) K_t$. The length of a general learning period starting at time t is then given by:

$$\Delta = \frac{\delta R}{(1-\delta) K_t}.$$

Using this equation for the length of a learning period, learning period module 405 may determine the number of learning periods during the period [0, T] based upon the duration of the advertising period [0, T] during which the advertisement can be placed on a web page and/or upon a variance tolerance parameter. When using the duration of the advertising period, learning period module 405 may determine that the number of learning periods equals:

$$N_T = \max\left\{\left[\frac{\log(R) - \log(T \times K_0 + R)}{\log(1-\delta)}\right], 1\right\}$$

Additionally, learning period module 405 may use a variance tolerance parameter, $\gamma$, to set the number of learning periods within advertising period [0, T]. For example, when the value of the estimated variance at time t is less than $\gamma^2$, learning period module 405 may determine that the value of learning is negligible. Accordingly, when using the variance tolerance parameter to determine the number of learning periods, learning period module 405 may set the number of learning periods in period [0, T] to equal:

$$N_\gamma = \max\left\{\left[\frac{2\log(\gamma) - \log(K_0)}{\log(1-\delta)}\right], 0\right\} + 1$$

Learning period module 405 may compare learning period calculations to determine the number of learning periods. For example, when the values of $N_T$ and $N_\gamma$ are calculated, learning period module 405 may choose the minimum number of learning periods that are calculated according to these different methods. Accordingly, learning period module 405 may set the number of learning periods N to equal the minimum of $N_T$ and $N_\gamma$.

Bid calculator 215 may specify the variance of the revenue rate at the beginning of each learning period by $K_0$ and $K_i(1-\delta)K_{i-1}$, for $i = 1, \ldots, N-1$. Accordingly, bid calculator 215 may compute the length of the learning periods to equal:

$$\Delta_i = \frac{\delta R}{(1-\delta) K_i} \text{ for } i = 1, \ldots, N-2$$

Finally, the length of the last learning period may be defined as:

$$\Delta_{N-1} = T - \sum_{i=0}^{N-2} \Delta_i$$

The times at which bid calculator 215 can decide to remove an advertisement from a web page occur at:

$t_0 = 0;$ $t_i = t_{i-1} + \Delta_{i-1}$, for $i = 1, \ldots, N-1$.

If the advertisement is not removed at time then it may be removed at time T, the end of the advertising period. Learning period module 405 may output series 460, T̄, which consists of decision times $t_i$ for $i = 0, \ldots, N-1$, at which bid calculator 215 may decide to maintain or remove an advertisement from a web page.

Continuing with FIG. 3B, to determine a bid price, process 300 estimates a cost rate per impression c (step 317). Based on the cost rate estimate, process 300 determines a current option rate (step 319) by applying the process described in FIG. 3A using lattice module 410. Lattice module 410 may accept verified data 420 from verified data storage 205 and series T̄ 460 as inputs.

Figure 5:
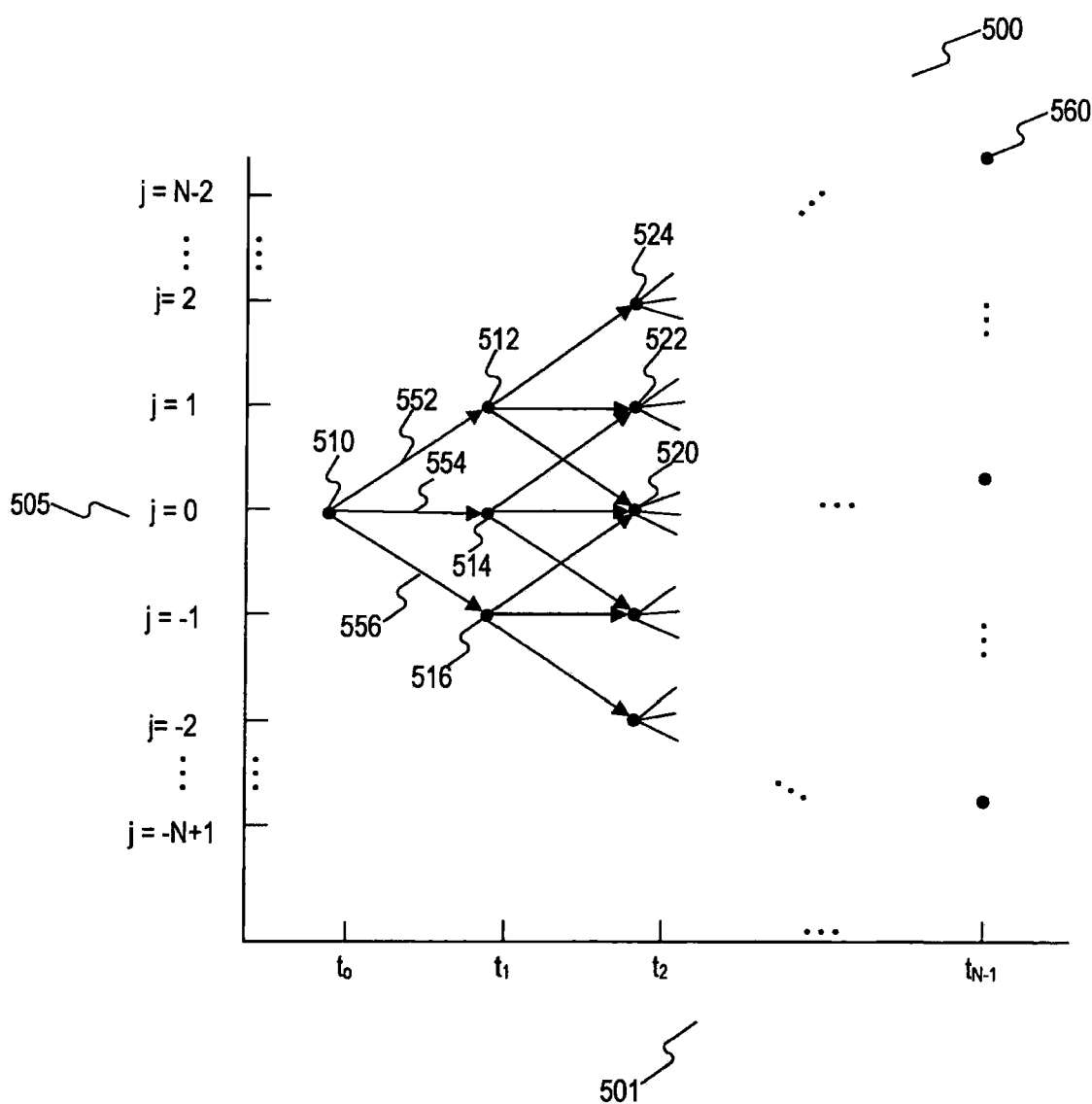
FIG. 5 shows an exemplary embodiment of a portion of a lattice structure consistent with an embodiment of the present invention.

FIG. 5 shows an exemplary embodiment of a lattice structure consistent with the present invention. Lattice structure 500 may be used to conceptualize the process by which lattice module 410 may determine the current option value based on cost rate estimate c. The x-axis 501 provides a timeline for measuring time during the advertising period [0, T]. Time progresses on x-axis 501 from left to right, so that time $t_0$ occurs before time $t_1$, time $t_1$ occurs before time $t_2$, etc. In lattice structure 500, time $t_0$ may represent the present time. Each subsequent marked time on x-axis 501 represents the beginning of a learning period when bid calculator 215 may decide to maintain or to remove an advertisement from a web page.

The y-axis 505 enumerates nodes of the expected revenue rate, where each node corresponds to a state of the estimated revenue rate for maintaining an advertisement on a web page. Each state contains an estimate of the revenue rate and its variance. In some embodiments, the values on the y-axis may provide the expected revenue rate for a single learning period. For example, the y-axis value for node 512 may represent an expected revenue rate for maintaining an advertisement on a web page from time $t_1$ to time $t_2$ only.

Each of the nodes in lattice structure 500 represents an expected revenue rate for maintaining an advertisement on a web page for a specific learning period. As shown in FIG. 5, each learning period after the first learning period may have more than one expected revenue rates. For example, the learning period that begins at time $t_1$ may have three different nodes 512, 514, and 516. Each of the different nodes may represent different estimated expected revenues rates for a learning period. For example, the expected revenue rates for time $t_1$ associated with nodes 512, 514, and 516 may represent three different values. Thus, the expected revenue rate may be $0.0050 per impression for node 12, $0.0048 per impression for node 414, and $0.0046 for node 516.

Lattice structure 500 may also be used to represent relationships between nodes occurring at different learning periods. For example, the lines 552, 554, and 556 connecting node 510 to nodes 512, 514, and 516, respectively, may represent a relationship between node 510 and nodes 512, 514, and 516. Lattice module 410 may represent these relationships as a probability that the expected revenue rate will move from a first node that occurs first in time to a second node that occurs later in time. For example, line 552 connects, and denotes a relationship between, node 510 and node 512. Because node 510 occurs first in time, line 552 may represent the transition probability that the expected revenue rate for maintaining an advertisement will move from node 510 at time $t_0$ to node 512 at time $t_1$. If the expected revenue rate at node 510 is $0.0048 per impression and the revenue rate at node 512 equals $0.0050 per impression, line 552 may represent the transition probability (e.g., 15%) that the revenue rate will increase from $0.0048 per impression at time $t_0$ to $0.0050 per impression at time $t_1$. The transition probability may be defined as $p_i^{j,k}=\text{Prob}\{\check{r}_{i+1}^k, \check{r}_i^j\}$.

Lattice module 410 may calculate the expected revenue rates for each node and the probabilities connecting the nodes in lattice structure 500. In some embodiments, lattice structure 500 may require that each node not in the last learning period be connected to three different nodes in the next learning period. For example, as shown in FIG. 5, node 512 at time $t_1$ connects to nodes 524, 522, and 520 at time $t_2$. Further, the estimated revenue rates for the three nodes in the next learning period may be a step up from (i.e. greater than), equal to, and a step down from (i.e. less than) the estimated revenue rate in the current learning period. For example, the estimated revenue rate at node 524 may be greater than the estimated revenue rate at node 512, the estimated revenue rate at node 522 may be equal to the estimated revenue rate at node 512, while the estimated revenue rate at node 520 may be less than that at node 512. Similarly, nodes 524, 522, and 520 may each be connected to three different nodes in learning period $t_3$.

Lattice module 410 may establish a relationship between the values for the revenue rate for each node and the probabilities connecting the nodes. For example, bid calculator 215 may calculate the value for the revenue rate of each node by requiring that the step up from a node equal the step down from the node. Accordingly, a value $\varepsilon$ may exist such that:

$$\check{r}_{i+1}^k = \begin{cases} \check{r}_i^j + \varepsilon & \text{for } k = j+1 \\ \check{r}_i^j & \text{for } k = j \\ \check{r}_i^j - \varepsilon & \text{for } k = j-1 \end{cases}$$

Bid calculator 215 may use the value $\varepsilon$ to determine the values for the probabilities connecting the nodes. Additionally, lattice module 410 may manipulate the revenue rate model to calculate the probabilities connecting the nodes in lattice structure 500. Corresponding to the observed revenue rate model $y_{t+\Delta}=r+v_{t,\Delta}$, the mean and variance of the distribution of the revenue rate estimate at node j at time $t_i$ may be defined as $\check{r}_i^j$ and $K_j$, respectively. Using Kalman update equations and the revenue rate model, the mean and variance of the estimated revenue rate during the next learning period beginning at time $t_{i+1}$ may be determined as:

$$E\left[\check{r}_{i+1} \mid \psi_i^j\right] = \check{r}_i^j$$

$$\text{Var}\left[\check{r}_{i+1} \mid \psi_i^j\right] = \sigma_{i+1}^2 = \frac{K_i^2}{K_i + \frac{R}{\Delta_i}}$$

In these equations, $\psi_i^j$ may be composed of the elements $\check{r}_i^j$ and $K_i$. For example, $\psi_i^j$ may represent a state having mean $\check{r}_i^j$ and variance $K_i$. The state for the initial node is determined by the inputs, i.e. $\psi_0^0=(\check{r}, K_0)$. Lattice module 410 may define the probabilities associating nodes as a function of the first two moments of the random variable described by the mean, $E[\check{r}_{i+1}|\psi_i^j]$, and variance, $\text{Var}[\check{r}_{i+1}|\psi_i^j]$, obtained by the Kalman update equations. Matching the first moment requires that $p_i^{j,j+1}=p_i^{j,j-}$. By matching the second moment, lattice module 410 may require that:

$$p_i^{j,k} = \begin{cases} \dfrac{\sigma_{i+1}^2}{2\varepsilon^2} & \text{for } k = j+1, j-1 \\ 1 - \dfrac{\sigma_{i+1}^2}{\varepsilon^2} & \text{for } k = j \end{cases}$$

To complete the transition probabilities, lattice module 410 may set the value of $\varepsilon$ so that no negative probability values are calculated. For example, recognizing that $\sigma_i > \sigma_{i+1}$, lattice module 410 may set the value of $\varepsilon=\sigma_1$ so that $\varepsilon^2=(\sigma_1)^2$. Accordingly, lattice module 410 determine that:

$$\varepsilon^2 = (\sigma_1)^2 = \frac{K_0^2}{K_0 + \frac{R}{\Delta_0}}$$

As a result, lattice module 410 may use the value of $\varepsilon$ to establish a relationship between the values for the revenue rate for each node and the probabilities connecting the nodes.

After determining the value for each node and the transition probabilities, lattice module 410 may determine the option values for each node. As discussed previously, the option value may consist of an expected profit component and a future value component. Lattice module 410 may begin by determining the option values for the nodes in the last learning period as shown by row 560 in lattice structure 500. Because no learning periods occur after this learning period, the future value component for the nodes in the last learning period may equal zero. Thus, lattice module 410 may only need to calculate the expected profits for nodes in the last learning period. The expected profit for the last learning period may equal the expected revenue rate for the node minus the cost rate of maintaining the advertisement, accumulated over the last learning period. This discounted value of the expected profit may be determined as:

$$\left| \int_0^{\Delta_{N-1}} e^{-\mu\tau}\left(\tilde{r}_i^j - c\right) d\tau = \frac{1-e^{-\mu\Delta_{N-1}}}{\mu}\left(\tilde{r}_i^j - c\right) \right|$$

Thus, the option value for each node during this learning period may be:

$$V_{N-1}^j = \frac{1-e^{-\mu\Delta_{N-1}}}{\mu}\max\{\tilde{r}_{N-1}^j - c, 0\}$$

After calculating the option value for each node in the last learning period, lattice module 410 may calculate the option value for those nodes in the immediately preceding learning period that begins at time $t_{N-2}$. The continuation value at this point may equal the estimated profit during the learning period at $t_{N-2}$ as well as the discounted future value calculated for the end of this learning period. Lattice module 410 may use the transition probabilities and the option values calculated for the nodes in the last learning period to calculate the continuation value for the learning period beginning at time $t_{N-2}$. For example, lattice module 410 may calculate the continuation value for each node in this learning period as:

$$C_{N-2}^j = \frac{1-e^{-\mu\Delta_{N-2}}}{\mu}\left(\tilde{r}_{N-2}^j - c\right) + e^{-\mu\Delta_{N-2}}\sum_{k=j-l}^{j+l} p_{N-2}^{j,k} V_{N-1}^k$$

Lattice module 410 may use the continuation value for each node in the learning period beginning at time $t_{N-2}$ to calculate the option value for each of these nodes.

Figure 6:
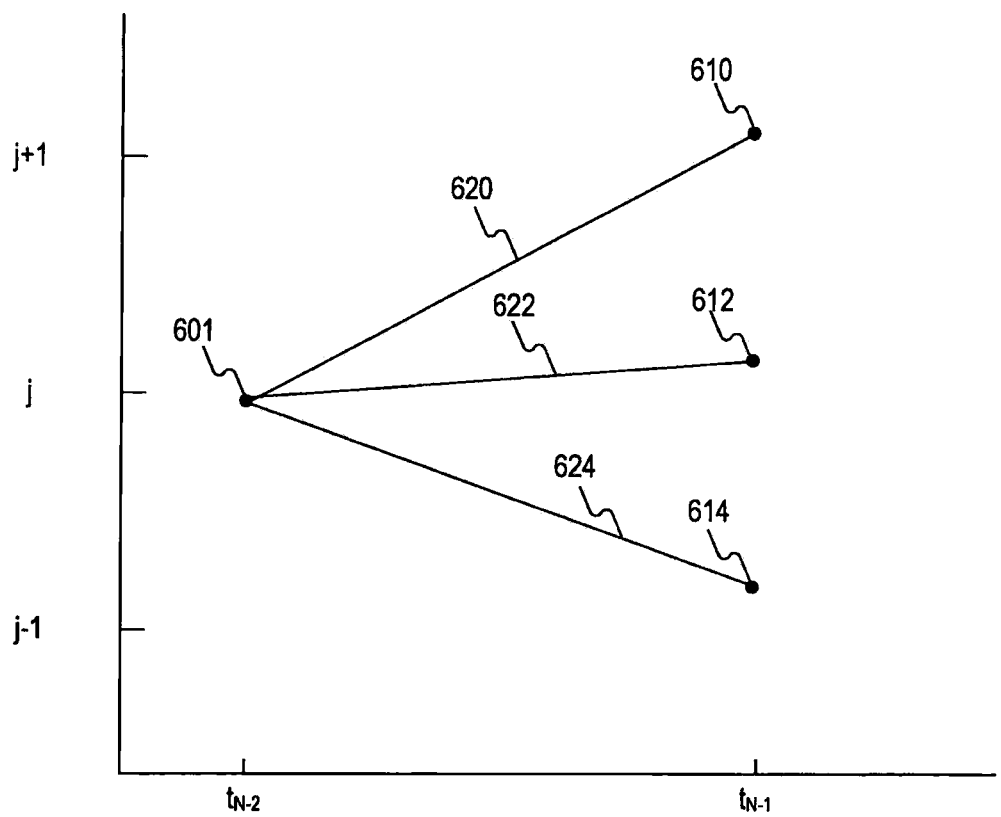
FIG. 6 shows an exemplary embodiment of a portion of a lattice structure consistent with an embodiment of the present invention.

FIG. 6 shows an exemplary embodiment of a portion of a lattice structure consistent with an embodiment of the present invention and can be used to illustrate the calculation of the option value for a node. In FIG. 6, node 601 occurs at time $t_{N-2}$ and is associated with nodes 610, 612, and 614, each of which occur at $t_{N-1}$, the beginning of the last learning period. The revenue rate at node 610 is a step up from the revenue rate of node 601, the revenue rate at node 612 equals the revenue rate of node 601, and the revenue rate of node 614 is a step down from the revenue rate of node 601. The transition probability 620 represents the probability that the revenue rate at node 601 will transition to the revenue rate at node 610. Transitions probabilities 622 and 624 represent the same probabilities for nodes 612 and 614, respectively. In this exemplary embodiment, transition probability 620 may equal transition probability 624.

Lattice module 410 may have placed values onto the nodes and transition probabilities in FIG. 6. For example, lattice module 410 may have found during a previous calculation that both of the transition probabilities 620 and 624 may equal, for example, 0.15. Accordingly, in this example, transition probability 622 equals 0.70. A previous calculation by lattice module 410 may have also have determined the option value for each of nodes 610, 612, and 614. In this example, lattice module 410 may have calculated the discounted option value for node 610 to be $50, for node 612 to be $45, and for node 614 to be $40. Finally, lattice module may have calculated the discounted total profit for node 601 during the learning period at time $t_{N-2}$ to equal $42. Using these values, lattice module 410 may calculate the continuation value for node 601 as:

$$C_{T-2}^j = \$42 + (0.15 \times \$50) + (0.70 \times \$45) + (0.15 \times \$40) = \$87$$

Because the continuation value for node 601 is greater than zero, the option value for node 601 equals $87.

Lattice module 410 may perform similar calculations for each node in a learning period. Lattice module 410 may also progress back though lattice structure 500 by calculating the continuation values and option values for nodes in preceding learning periods. Using this method, lattice module 410 may calculate the option value $V_0^0$ at time $t_0$. $V_0^0$ is the current option value given the current state of the revenue rate estimate and the supplied cost rate.

Continuing with FIG. 3B, process 300 determines when the current option rate is zero (step 321) and then sets the bid equal to the cost rate c when that occurs. Given the relationship between $\Psi_0^0$ and $\tilde{r}$, V may be written as a function of $K_0$, c, and $\tilde{r}$. V may further be written as a function of the difference between $\tilde{r}$ and c. Finally, because c equals $\tilde{r}$ plus the learning value, V may also be written as a function of the negative learning value, $-lv$. Accordingly, the learning value may be computed by setting $V(-lv)$ equal to 0 and solving for the root of this equation.

In some embodiments, a value for V may be computed using a bi-section method. For example, a value, $x_0$ may be found such that $V(x_0)$ equals zero. The value of the learning value may then equal $-x_0$. As a first step, the value of $V(0)$ may be computed. If $V(0)$ equals zero, then the learning value also equals zero. If the value of $V(0)$ does not equal zero, then the value of $x_u$ may be set to zero. Next, the value of $x_1$ is found where $V(x_1)$ is less than zero. An initial guess for $x_1$ may be set at a negative number with a magnitude larger than the learning value. For example, in some embodiments, the value for $x_1$ may be set at $-5\sqrt{K_0}$ The value for $x_{new}$ may be set to equal $$\frac{x_1 + x_u}{2},$$

and the value of $V(x_{new})$ may be computed. If the value of $V(x_{new})$ is greater than zero, then the value of $x_u$ may be set to $x_{new}$; otherwise, the value of $x_l$ may be set to $x_{new}$. If the absolute value of $x_u$ minus $x_l$ is less than a bisection tolerance parameter θ, then the learning value may be set to $$\frac{x_l + x_u}{2}.$$

Otherwise, the process may repeat by finding a new value for $x_{new}$ that equals $$\frac{x_l + x_u}{2}$$

and computing a new value for $V(x_{new})$.

The following steps in a bi-sectional method may be used in some embodiments to find the learning value:
1. Set $x_u$=0.
2. Find a value of $x_l$ such that $V(x_l)<0$. For example, $x_l$ may be set to equal $-5\sqrt{K_0}$
3. Set $$x_{new} = \frac{x_l + x_u}{2}$$

and compute $V(x_{new})$. If $V(x_{new})>0$, then set $x_u=x_{new}$. Otherwise, set $x_l=x_{new}$.
4. If $|x_u-x_l|<θ$, then set the learning value equal to $$-\frac{x_l + x_u}{2}.$$

Otherwise, return to step (3).

When the current option value equals zero (step 321, YES), the bid value is set to the current cost rate estimate (step 323). The bid value may be submitted to exchange 105. Exchange 105 may use the returned bid value $B_0^0$ in filling requests 117 from publisher 107. Additionally, or alternatively, campaign manager 213 may submit a value based on the bid value to exchange 105. For example, campaign optimizer 103 may calculate a learning value that is then added to a revenue rate. The sum of the revenue rate and the learning value may then be submitted to exchange 105. In some embodiments, the revenue rate used to compute the sum may be different than the revenue rate used by campaign optimizer 103 to calculate the learning value. Campaign optimizer 103 may use additional or alternative equations to calculate a learning value.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for determining a bid parameter for displaying electronic content on one or more target web pages, the method comprising:
receiving, by a campaign optimizer of an electronic device over an electronic network, i) campaign goal data and ii) electronic content for display on one or more web pages;
based on the campaign goal data, identifying, by the campaign optimizer, a target web page from the one or more web pages, the target web page including at least one or more cells for displaying the electronic content at a particular place and time;
receiving, by the campaign optimizer, target web page data comprising data values;
determining failures with receiving the data values of the target web page data, the failures comprising signals exhibiting out of control or abnormal behavior;
providing a warning indication for the out of control or abnormally behaving data values;
parsing, by the campaign optimizer, the target web page data to recursively determine one or more current option values for one or more learning periods, wherein determining the one or more current option values for the one or more learning period includes:
determining cell inventory levels of the target web page via a query to a database;
determining a continuation value associated with an expected value for maintaining a display of the electronic content on the target web page for the learning period;
determining, by a Markov decision modeling process, an option value associated with an option to stop communicating the electronic content during the learning period;
determining a current cost rate estimate;
setting a current option value to equal the option value based on the current cost rate estimate;
iteratively adjusting the current cost rate estimate until the option value equals zero;
calculating a bid parameter based on determining that the current option value is zero, and wherein the bid parameter includes a lattice structure comprising one or more nodes, each node representing an expected revenue value for maintaining a display of the electronic content on the target web page;
transmitting, by the campaign optimizer, a bid value based on the bid parameter, to a server processor associated with the target web page, the bid value being an acceptable offer to display the electronic content at a particular place and time for a price; and
based on acceptance of the bid value, displaying the electronic content on the target web page.

2. The computer-implemented method of claim 1, further comprising calculating an expected value, wherein calculating the expected value includes:
associating a set of expected values with the learning period starting at an initial time;
assigning a set of transition probabilities to an initial expected value in the set of expected values, the set of transition probabilities defining a relationship between the initial expected value and one or more later expected values for a second learning period; and
determining an expected value based on at least one of the transition probabilities and at least one of a later expected revenue rates.

3. The computer-implemented method of claim 2, further comprising:
creating the lattice structure, the lattice structure including a set of nodes, wherein an initial node corresponds to the initial expected value in the set of expected values.

4. The computer-implemented method of claim 3, wherein a location of the initial node in the lattice structure is a function, at least in part, of the initial expected value.

5. The computer-implemented method of claim 3, wherein the set of transition probabilities associated with the initial expected value is further associated with the corresponding initial node.

6. The computer-implemented method of claim 3, wherein the set of transition probabilities comprises:
   a higher-revenue transition probability defining a relationship between the initial node and a first later node in a second learning period;
   a neutral-revenue transition probability defining a relationship between the initial node and a second later node in the second learning period; and
   a lower-revenue transition probability defining a relationship between the initial node and a third later node in the second learning period.

7. The computer-implemented method of claim 6, wherein the difference in revenue between the first later node and second later node equals the difference in revenue between the second later node and the third later node.

8. The computer-implemented method of claim 6, wherein the higher-revenue transition probability equals the lower-revenue transition probability.

9. The computer-implemented method of claim 1, further comprising:
   calculating a duration of the learning period as a function, at least in part, of a measurement noise and an initial revenue-rate variance.

10. The computer-implemented method of claim 9, wherein calculating the duration of the learning period comprises calculating the duration as a function, at least in part, of a variance-reducing parameter that determines a reduction in the initial revenue-rate variance.

11. The computer-implemented method of claim 10, wherein the variance-reducing parameter is defined by a user.

12. The computer-implemented method of claim 1, further comprising:
   calculating a learning value as a function, at least in part, of the bid parameter and the expected value of the learning period.

13. A bid calculating system for determining a bid parameter of electronic content for display on one or more target web pages, the bid calculating system comprising:
   a storage device that stores instructions for determining a bid parameter of electronic content; and
   a processing device that executes the instructions to perform the following operations:
   receiving, by a campaign optimizer of an electronic device over an electronic network, i) campaign goal data and ii) electronic content for display on one or more web pages;
   based on the campaign goal data, identifying, by the campaign optimizer, a target web page from the one or more web pages, the target web page including at least one or more cells for displaying the electronic content at a particular place and time;
   receiving, by the campaign optimizer, target web page data comprising data values;
   determining failures with receiving the data values of the target web page data, the failures comprising signals exhibiting out of control or abnormal behavior;
   providing a warning indication for the out of control or abnormally behaving data values;
   parsing, by the campaign optimizer, the target web page data to recursively determine one or more current option values for one or more learning periods, wherein determining the one or more current option values for the one or more learning period includes:
   determining cell inventory levels of the target web page via a query to a database;
   determining a continuation value associated with an expected value for maintaining a display of the electronic content on the target web page for the learning period;
   determining, by a Markov decision modeling process, an option value associated with an option to stop communicating the electronic content during the learning period;
   determining a current cost rate estimate;
   setting a current option value to equal the option value based on the current cost rate estimate;
   iteratively adjusting the current cost rate estimate until the option value equals zero;
   calculating a bid parameter based on determining that the current option value is zero, and wherein the bid parameter includes a lattice structure comprising one or more nodes, each node representing an expected revenue value for maintaining a display of the electronic content on the target web page;
   transmitting, by the campaign optimizer, a bid value based on the bid parameter, to a server processor associated with the target web page, the bid value being an acceptable offer to display the electronic content at a particular place and time for a price; and
   based on acceptance of the bid value, displaying the electronic content on the target web page.

14. The bid calculating system of claim 13, wherein the processing device further executes the instructions to perform the following operation:
   calculating a learning value as a function, at least in part, of the bid parameter and the expected value of the learning period.

15. The bid calculating system of claim 13, wherein the processing device further executes the instructions to perform the following operations:
   associating a set of expected values with the learning period starting at an initial time;
   assigning a set of transition probabilities to an initial expected revenue rate in the set of expected values, the set of transition probabilities defining a relationship between the initial expected value and one or more later expected values for a second learning period; and
   determining an expected value based on at least one of the transition probabilities and at least one of the later expected values.

16. The bid calculating system of claim 15, wherein the processing device further executes the instructions to perform the following operation:
   creating the lattice structure, the lattice structure including a set of nodes, wherein an initial node corresponds to the initial expected value in the set of expected values.

17. The bid calculating system of claim 13, wherein the processing device further executes the instructions to perform the following operation:
   calculating a duration of the learning period as a function, at least in part, of a measurement noise and an initial revenue-rate variance.

18. The bid calculating system of claim 17, wherein the processing device further executes the instructions to perform the following operation:

calculating the duration of the learning period as a function, at least in part, of a variance-reducing parameter that determines a reduction in the initial revenue-rate variance.

19. The bid calculating system of claim 18, wherein the variance-reducing parameter is defined by a user.

20. A non-transitory computer-readable medium storing instructions that, when executed by a processing device, cause the processing device to implement a method, the method comprising:

receiving, by a campaign optimizer of an electronic device over an electronic network, i) campaign goal data and ii) electronic content for display on one or more web pages;

based on the campaign goal data, identifying, by the campaign optimizer, a target web page from the one or more web pages, the target web page including at least one or more cells for displaying the electronic content at a particular place and time;

receiving, by the campaign optimizer, target web page data comprising data values;

determining failures with receiving the data values of the target web page data, the failures comprising signals exhibiting out of control or abnormal behavior;

providing a warning indication for the out of control or abnormally behaving data values;

parsing, by the campaign optimizer, the target web page data to recursively determine one or more current option values for one or more learning periods, wherein determining the one or more current option values for the one or more learning period includes:

determining cell inventory levels of the target web page via a query to a database;

determining a continuation value associated with an expected value for maintaining a display of the electronic content on the target web page for the learning period;

determining by a Markov modeling decision process, an option value associated with an option to stop communicating the electronic content during the learning period;

determining a current cost rate estimate;

setting a current option value to equal the option value based on the current cost rate estimate;

iteratively adjusting the current cost rate estimate until the option value equals zero;

calculating a bid parameter based on determining that the current option value is zero, and wherein the bid parameter includes a lattice structure comprising one or more nodes, each node representing an expected revenue value for maintaining a display of the electronic content on the target web page;

transmitting, by the campaign optimizer, a bid value based on the bid parameter, to a server processor associated with the target web page, the bid value being an acceptable offer to display the electronic content at a particular place and time for a price; and based on acceptance of the bid value, displaying the electronic content on the target web page.

* * * * *